United States Patent
Nielsen

(10) Patent No.: US 6,843,169 B2
(45) Date of Patent: Jan. 18, 2005

(54) TRIM TABLE

(75) Inventor: Ulrich Carlin Nielsen, Ry (DK)

(73) Assignee: Scanvaegt International A/S, Aarhus (DK)

( * ) Notice: Subject to any disclaimer, the term of this patent is extended or adjusted under 35 U.S.C. 154(b) by 0 days.

(21) Appl. No.: 10/466,493

(22) PCT Filed: Jan. 15, 2002

(86) PCT No.: PCT/DK02/00026

§ 371 (c)(1),
(2), (4) Date: Dec. 5, 2003

(87) PCT Pub. No.: WO02/069722

PCT Pub. Date: Sep. 12, 2002

(65) Prior Publication Data

US 2004/0077302 A1 Apr. 22, 2004

(30) Foreign Application Priority Data

Jan. 16, 2001 (DK) ........................................ 2001 00073

(51) Int. Cl.$^7$ ........................... A23L 1/00; A23N 15/00; A23N 15/02; A23N 7/00; A47J 17/00
(52) U.S. Cl. ............................. 99/489; 99/486; 99/537; 452/156; 452/163
(58) Field of Search ........................... 99/537–541, 567, 99/486, 584–593, 635–642, 545, 485, 543, 489; 452/135, 136, 125, 128, 160, 163, 166, 156; 269/24, 25, 54.1; 108/24

(56) References Cited

U.S. PATENT DOCUMENTS

| 692,866 | A | | 2/1902 | Lawrence | |
|---|---|---|---|---|---|
| 3,561,512 | A | * | 2/1971 | Farmer | 99/484 |
| 3,677,315 | A | * | 7/1972 | Cox | 83/14 |
| 4,651,635 | A | * | 3/1987 | Ally | 99/450.6 |
| 4,658,714 | A | * | 4/1987 | McIlvain et al. | 99/637 |
| 4,998,323 | A | * | 3/1991 | Martin et al. | 452/125 |
| 5,074,203 | A | * | 12/1991 | Hirtle et al. | 99/544 |
| 5,169,663 | A | * | 12/1992 | Rossi et al. | 426/482 |
| 5,273,485 | A | * | 12/1993 | Hegelmann et al. | 452/179 |
| 5,372,538 | A | * | 12/1994 | Ketels | 452/135 |
| 5,533,928 | A | * | 7/1996 | Karubian et al. | 452/135 |
| 5,598,773 | A | * | 2/1997 | Hoffseth | 99/585 |
| 5,865,111 | A | * | 2/1999 | Hanson | 99/637 |
| 6,415,698 | B1 | * | 7/2002 | Haas et al. | 83/255 |

FOREIGN PATENT DOCUMENTS

| DE | 699210 | 11/1940 |
|---|---|---|
| DE | 739656 | 10/1943 |
| FR | 1 435 117 | 3/1966 |
| FR | 2 676 620 | 11/1992 |
| FR | 2 689 374 | 10/1993 |
| WO | WO 88/07329 | 10/1988 |
| WO | WO 98/12929 | 4/1998 |

* cited by examiner

Primary Examiner—Timothy F. Simone
(74) Attorney, Agent, or Firm—Nixon Peabody LLP; David S. Safran

(57) ABSTRACT

A trim table for use by trimming and/or cutting of food products, such as chicken or fish, has conveyors (2, 12) for feeding products to a number of operator stands (O1 ... O8), each of which receivers (14, 24R, 28R) for receiving products (10), a cutting table (16, 24C, 28C) for trimming and/or cutting the products (10) into product pieces (10a, 10b) and sorters (6, 20), and further, transport of the cut or trimmed products (10a, 10b). One or more of the operator stands (O1 ... O8) are provided with mechanisms (18, 24, 28) for automatic transferal of the products (10) from the receivers (14, 24R, 28R) onto the cutting table (16, 24C, 28C). By a trim table, the products are brought to the operator, so that the operator is spared from having to repeatedly lift products as has necessary in the past. As a result, the operator's working position is significantly improved, just as the work place at the trim table according to the invention is also improved ergonomically.

31 Claims, 7 Drawing Sheets

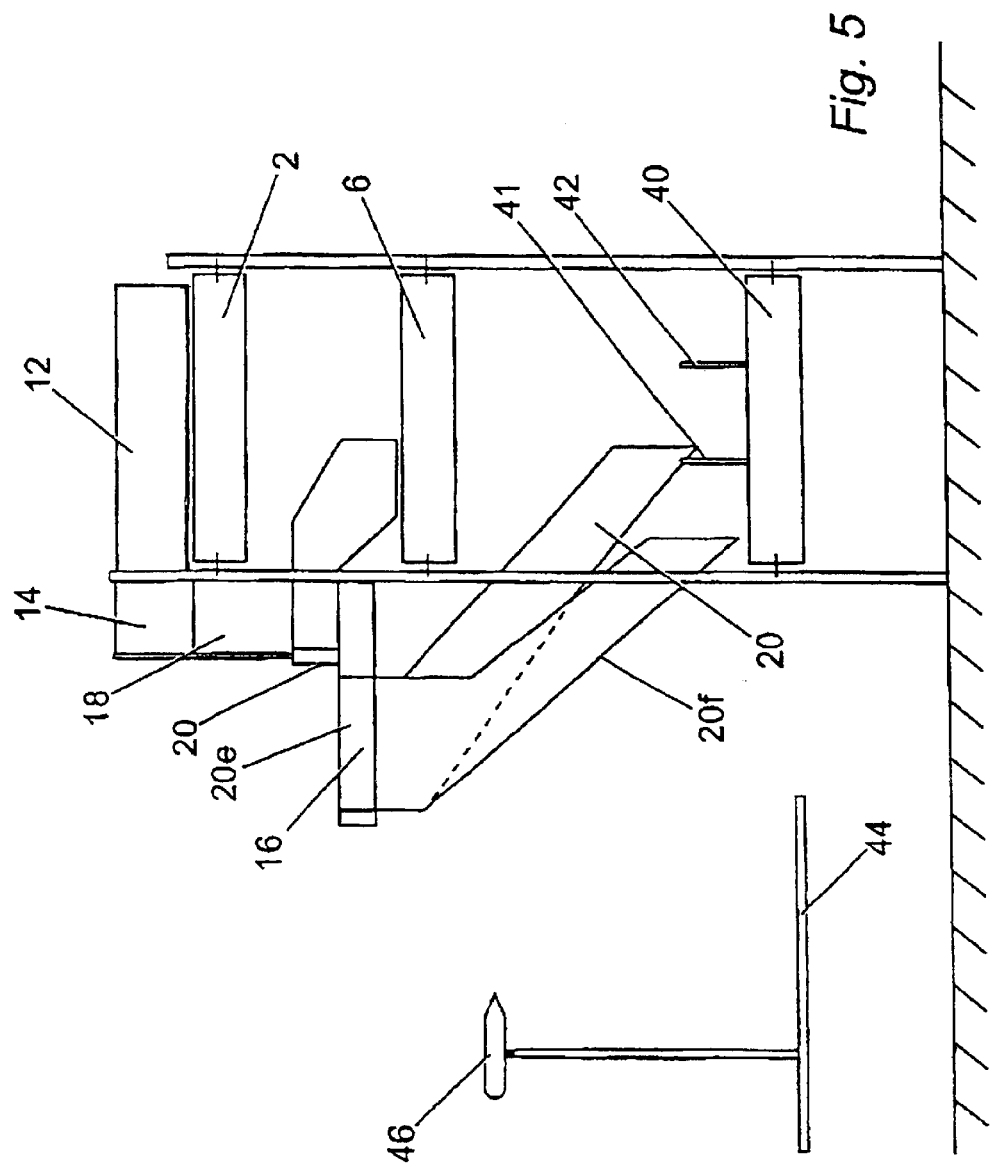

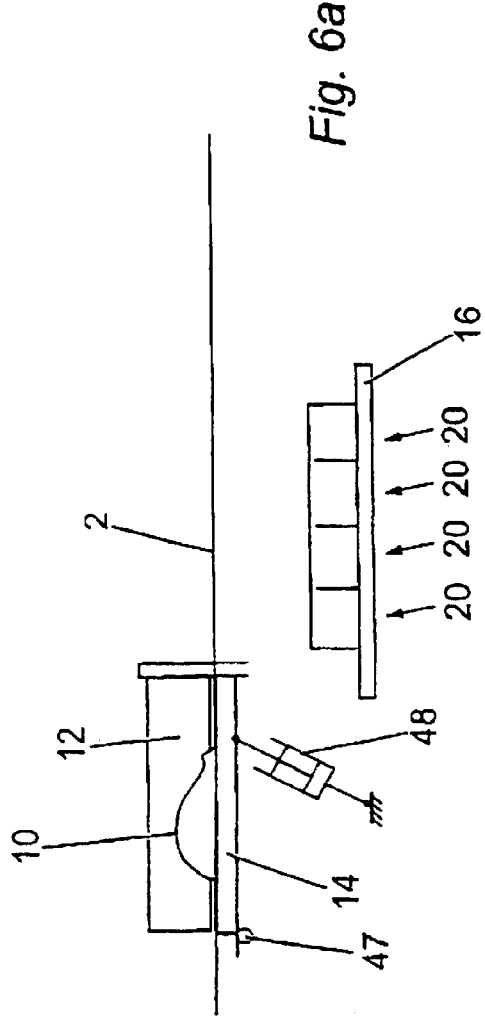
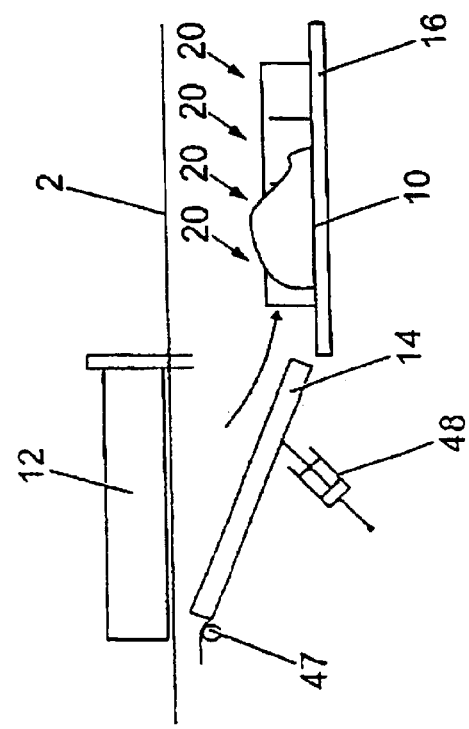

TRIM TABLE

BACKGROUND OF THE INVENTION

1. Field of the Invention

The present invention relates to a trim table for use by trimming and/or cutting of food products, such as chicken or fish, comprising conveying means for feeding products to a number of operator stands, each of which comprising means for receiving products, a cutting table for trimming and/or cutting the products into product pieces and means for sorting and further transport of the cut or trimmed products.

2. Description of Related Art

Within the food processing industry, it is common to arrange a trim table of the above-mentioned kind after a filleting machine or other process equipment for preliminary partition of meat products. After this, the meat products, in particular fish or chicken products are trimmed and cut into product pieces at the trim table.

The trim table comprises a first conveyor with a number of operator stands at each side of the conveyor, and a second conveyor for onward transport of the cut product pieces. An operator can order a portion of products for trimming, which is supplied on the above conveyor. In front of the operator, an arm is swung out across the conveyor and directs a product portion to the magazine of the operator stand. From this magazine, the operator takes one or more products at the time down to the cutting table for trimming and product cutting. After the trimming and cutting, the operator sorts the individual products after the product quality, size and/or type, just as the cut-away waste remains are disposed of. Each of the cut product pieces are led out through one of the arranged sorting chutes, which are arranged in connection with the cutting table and the outlet conveyor(s).

In connection with the inlet of the first conveyor of the trim table means may be arranged for automatic in-weighing of the product portions, just as a weighing out of the cut product pieces may be performed in connection with the second conveyor. Finally, a quality control operation may be arranged in connection with the out-weighing. With these weighing data a surveillance of the quantity and the quality of the trimming operations at the trim table may be carried out.

This type of trim table is known for the production of fish and chicken products. The process may be adapted to potentially particular demands to the handling of a given type of products, e.g., a particularly careful handling in connection with the conveying of the product portions to the operators magazine.

3. Description of Related Art

From published French Patent Application FR-A-2 689 374, a device with an operator stand is known in relation to a trim table, where the incoming products arrive in a transport container which is emptied into a magazine container, which is placed between an upper conveyor for onward transport of finished cut products and a lower conveyor for removal of waste. From the container, the operator must lift the products down to the cutting plate for trimming or cutting out the products. This lifting operation involves an extraordinary inconvenient, unergonomic working position, since the operator has to bend across the cutting plate in order to get to the products in the magazine.

By the magazine, the operator must repeatedly lift the products from the magazine down to the cutting table, which results in a bad ergonomic working position with repetitive movement. This is unhealthy for the operator and this working operation may contribute to a reduction in the working tempo.

SUMMARY OF THE INVENTION

It is therefore the object of the present invention to provide an improvement of this relation and provide an improved working position for the operators at a trim table within the food processing industry.

This object is achieved by a trim table of the initially mentioned kind, where one or more of the operator stands are provided with means for automatic transferral of the products from the receiving means to handling on the cutting table.

By a trim table according to the invention, the products are brought to the operator, so that the operator is spared from the repeated lifts that are characteristic for the hitherto known solutions. This means that the operator's working position is significantly improved, just as the work place at the trim table according to the invention is also improved ergonomically.

In a first embodiment of the invention, the receiving means are constituted by a tray for receiving and storing a portion of products and the means for transferral of the products comprise a sliding surface, which connects the tray with the cutting table. Hereby, a product in the portion may easily be guided from the storage tray onto the cutting table. The tray may be arranged in a level above the cutting table and wherein the sliding surface is provided with an inclination towards the cutting table. As a result, the product may easily slide down onto the cutting table, whereby the operator does not have to help by guiding the product transferral and without the product getting stuck, e.g., sticking to the tray due to the presence of mucus or another adhesive substance.

In a particular embodiment, the tray and/or the sliding surface may be provided with vibration means, a push device, and/or a conveyor. As a result, the products will automatically be aided down towards the cutting table without the risk of being retained. The vibration means may either be individually arranged and controlled at each operator stand or arranged as a common vibration device for a number of trays at more operator stands.

In the first embodiment, the sorting means include a number of sorting openings between the tray and the cutting table for categorization of the trimmed product pieces and preferably for dispatch of product remains, said openings being connected with means for further transport of the product pieces for further handling and/or dispatch of the product remains.

In a second embodiment, the tray is funnel shaped and provided with two inclined sliding surfaces, which guide the products down to the bottom of the funnel-shaped tray, the bottom being substantially level with the cutting table. Furthermore, means for collecting and delivery of the products from the sorting openings to a conveyor are preferably arranged in association with the sorting openings; the means for delivery are controlled according to the achievement of a predetermined sorting pattern on the conveyor. Thus, a well-organized trim table is provided, which provides for an appropriate workflow at the manual trimming/carving process. By arranging discharge means in connection with the dispatch of the sorted, cut-out products, the products may intermittently be laid out on a common conveyor in a known order, whereby the further handling of the products, e.g. in connection with weighing and packaging, by be carried out automatically and with a high quality.

Preferably, sorting openings are arranged at least at one side of the cutting table for receiving litter and with chutes for the removal of the product remains or the like. Furthermore, an underlying conveyor is provided with a sectioning in longitudinal sections and where the chutes in association with an operator stand are arranged for delivery of product remains and the like in two different sections. As a result, the product remains, such as waste or other product types, which are not handled on the present trim table, are sorted with respect to their further destination.

In a third embodiment, the receiving means are constituted by a tray for the receipt and storage of a product portion and the means for transfer of products comprise means for lowering the tray to the level of the cutting table. In particular, the means for lowering the tray are made up of a pivotable side hinging of the tray and a telescopic actuator, such as a pneumatically actuatable cylinder for pivoting the tray, whereby its surface constitutes a sliding surface. This embodiment is particularly suited to relative large and heavy products where the products may be received and transferred to the trimming on the cutting table without the operator having to handle the products and thereby exposing himself to risking to distortions or otherwise straining lifting operations.

In a fourth embodiment, the receiving means and the cutting table is a rotatable receiving and cutting plate, which has a receiving position, a cutting position and a sorting position for the products, and wherein the means for transfer comprises rotation means for rotating the plate. According to this embodiment, a portion of products may be delivered to the receiving position of the plate. The plate may then be rotated so that the portion is brought to the operator at the cutting position. After the trimming and sectioning at the cutting position, the cutting table is turned again so that the cut-out product pieces are moved to the sorting position for sorting and onwards transport. In this embodiment of the invention, a relative large cutting table is achieved as parts of the receiving and sorting sections may be used, e.g., by large products and/or if the operator for other reasons find it necessary.

In this embodiment, the cutting plate may be a substantially circular cutting plate, which is rotatably arranged for rotation in the direction from the receiving position towards the sorting position. Moreover, the sorting means are provided with one or more stationary, essentially tangentially orientated sorting ribs for sorting and further transport of the cut/trimmed product pieces for further handling by rotation of the plate. Hereby, the cut-out product pieces must only be placed in a given radial position on the table and then the sorting and the discharge of the product pieces for further transport takes place automatically, since the sorting ribs "scrape" the products off the plate.

In a further variant of this fourth embodiment, the sorting means comprise a number of sorting openings between the conveying means and the cutting plate for sorting the cut/trimmed product pieces, said openings being connected to means for further transport of the product pieces for further handling and/or removal of the product remains. Thus, the operator may sort the product pieces in the different product categories by discharging the product pieces into a relevant sorting opening from which the products automatically are transported onwards.

In a fifth embodiment of a trim table according to the invention, the receiving means and the cutting table is a shiftable receiving and cutting plate, which is provided with one or more categorization markings for sorting the cut/trimmed products and which cooperates with means for further transport of the product pieces for further handling. Hereby, an operator stand is achieved which only takes up a limited amount of space along the conveyor which in turn means that more operator stands along the trim table may be established, whereby the capacity of the trim table may be increased without increasing the overall length of the trim table.

In a particularly preferred variant of this embodiment, the shiftable cutting plate is substantially horizontally orientated in the receiving, storage and cutting positions and pivoted for dispatching the cut products from the plate in the sorting and emptying position. This results in that an automatic discharge of the cutting plate is achieved, since the cutting plate in the sorting and emptying position functions as a discharge chute from which the cut-out products slide down to the underlying outlet conveyor for further transport.

In this embodiment, two adjacent, shiftable cutting plates are preferably arranged at each operator stand. This means that a quick trimming and cutting process may be achieved since a new portion of products may be ordered on one plate, which is then waiting for processing while the products on the other plate are being processed.

The displacement of the cutting plate or plates is preferably controlled by operator operated control means, preferably in a predetermined pattern of movement. This means that the operator does not have to move anything else but the products around on the cutting table, as a control signal is given, e.g., by the operator moving his knife passed a sensor for shifting the position of the table.

In the following, the invention is described in more detail with reference to the accompanying drawings.

BRIEF DESCRIPTION OF THE DRAWINGS

FIG. 5 is a sectional view of the second embodiment, FIGS. 6*a* and 6*b* show details of a third embodiment.

DETAILED DESCRIPTION OF THE INVENTION

Figure 1:
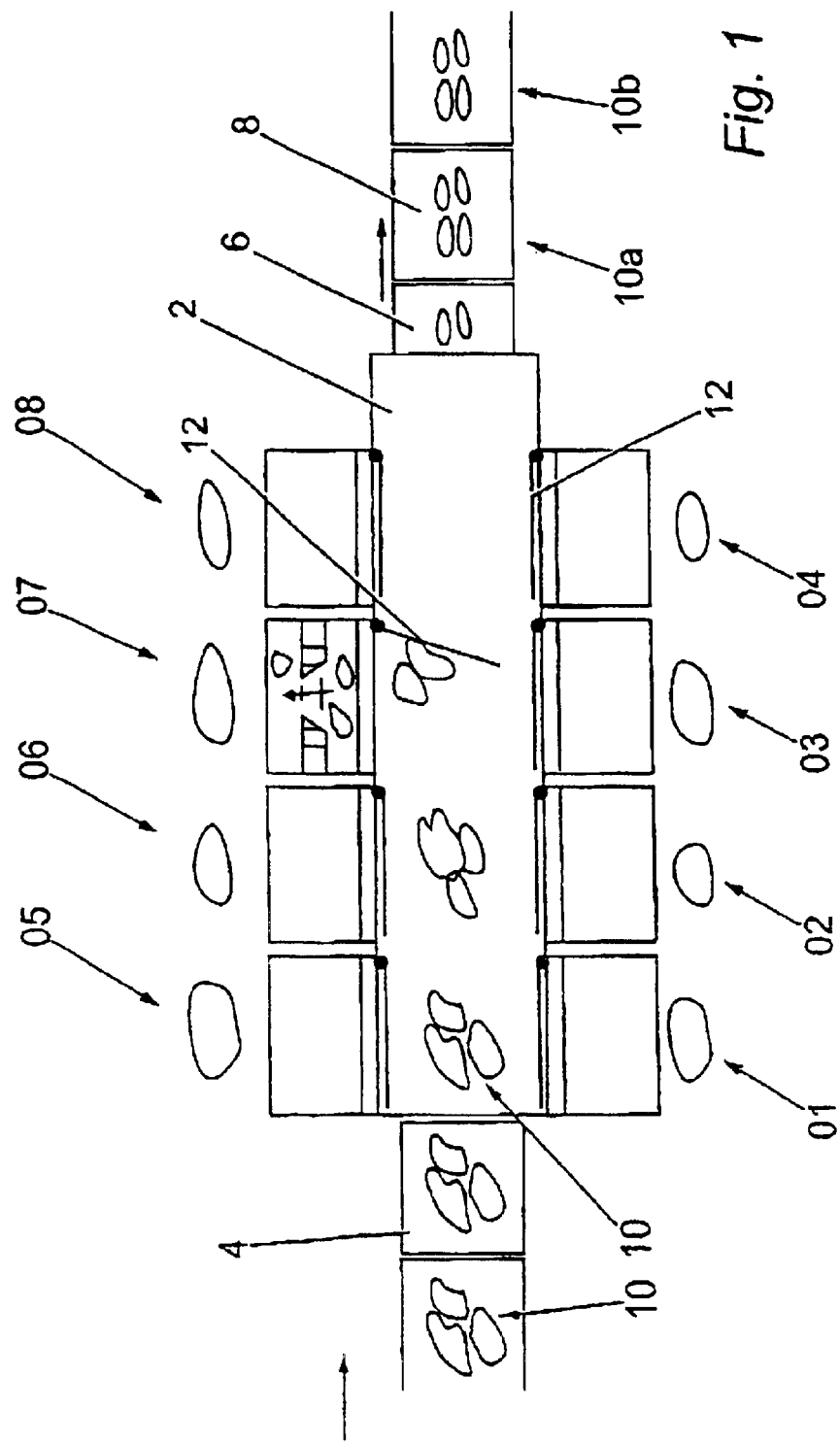
FIG. 1 is a schematic top view of a trim table.

In FIG. 1 is shown a schematic view of a trim table which is intended for trimming and cutting out meat products in the food processing industry, e.g., for use in processing fish or chicken products. The trim table comprises a conveyor 2 at each side of which a number of operator stands O1, O2, . . . . O8 are arranged where operators carry out trimming and cutting-out of the products 10 which are forwarded to the operator along a first conveyor 2 in portions. The portions are weighted in, e.g., at a weighing station 4, and the weight of each portion is registered in a computer based control system (not shown). After the products are trimmed and cut out into product pieces 10a, 10b, the pieces are discharged from the trim table on at least one outlet conveyor 6. The product pieces 10a, 10b from each of the operators are weighed out at one or more weighing stations 8 similar to the first weighing station 4. The weights of each of the portions of product pieces 10a, 10b from each of the operators are also registered in the control system so that a control with the waste percentages, production efficiency, etc. may be kept.

The trim table functions so that an operator, e.g., by O7, as shown in FIG. 1, orders a portion of products 10, which results in that an arm 12 is swung across the supply conveyor 2 so that a portion is "swept" into the operator stand (e.g., O7 as shown in FIG. 1).

Figure 2:
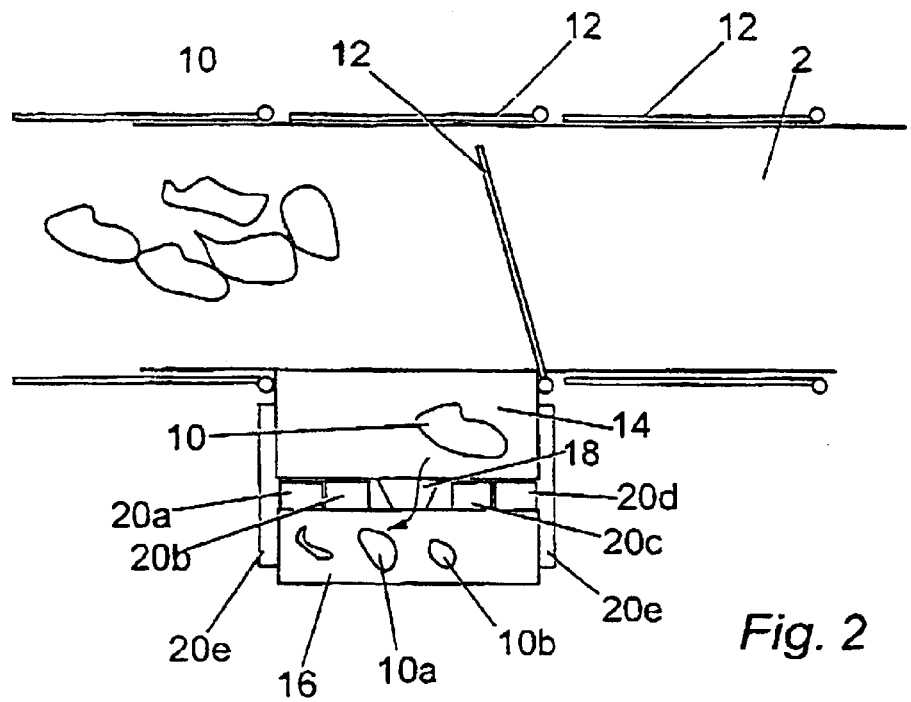
FIG. 2 is a top view of a section of a trim table with an operator stand according to the invention.

In a first embodiment of the invention, the portion of products 10 then falls down in a tray 14 (see FIGS. 2 and 3) where they are basically retained. From here, the operator may direct one or more products via a chute 18 and down on a cutting table 16 where the product(s) is/are trimmed and cut out, e.g. into fillets. The cut-out products 10a, 10b are classified according to product type and sorted into one or more sorting openings 20a . . . 20d from which the product pieces are fed via a chute or the like and down on an outlet conveyor 6 and transported away for further processing. Optionally, further product sorting openings or waste collections 20e and 20f may be provided at each side of the cutting table so that the operator simply has to sweep the cut-away product remains, such as bones, fat or the like, over the side of the cutting table 16. Alternatively, one or more of the sorting openings 20a, 20b, 20c, 20d could be dedicated for this purpose.

Figure 3:
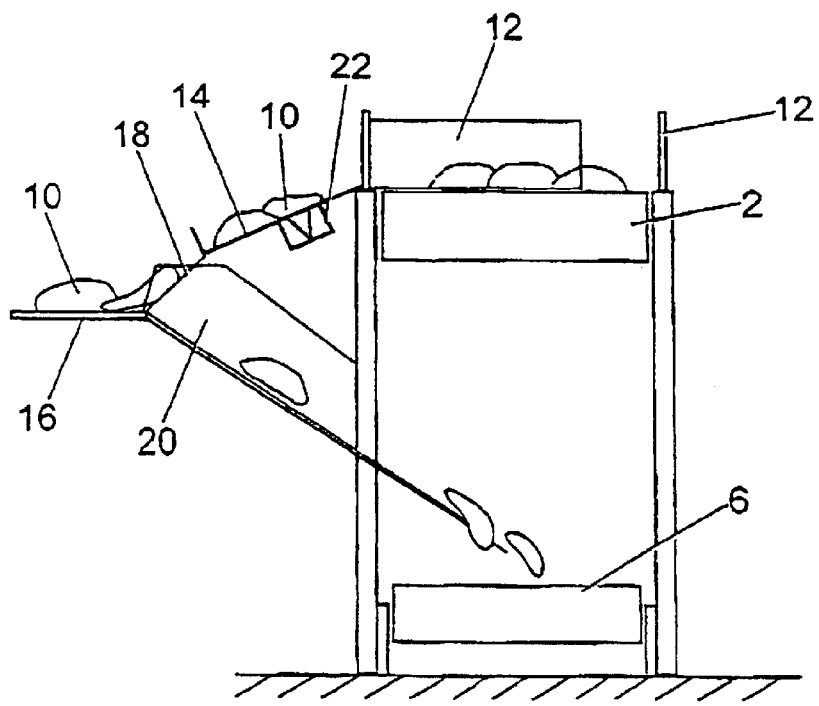
FIG. 3 is a sectional side view of the same.

As shown in FIG. 3, the sliding surface 18 is slopped down towards the cutting table 16. The tray 14 is also provided with a small inclination, so that the products can slide down towards the chute 18. In order to aid the products towards the sliding surface 18, the tray may be provided with vibration means 22 or pushing means (e.g., a pusher) so that the products are not prevented from sliding because they stick to the substrate.

Figure 4:
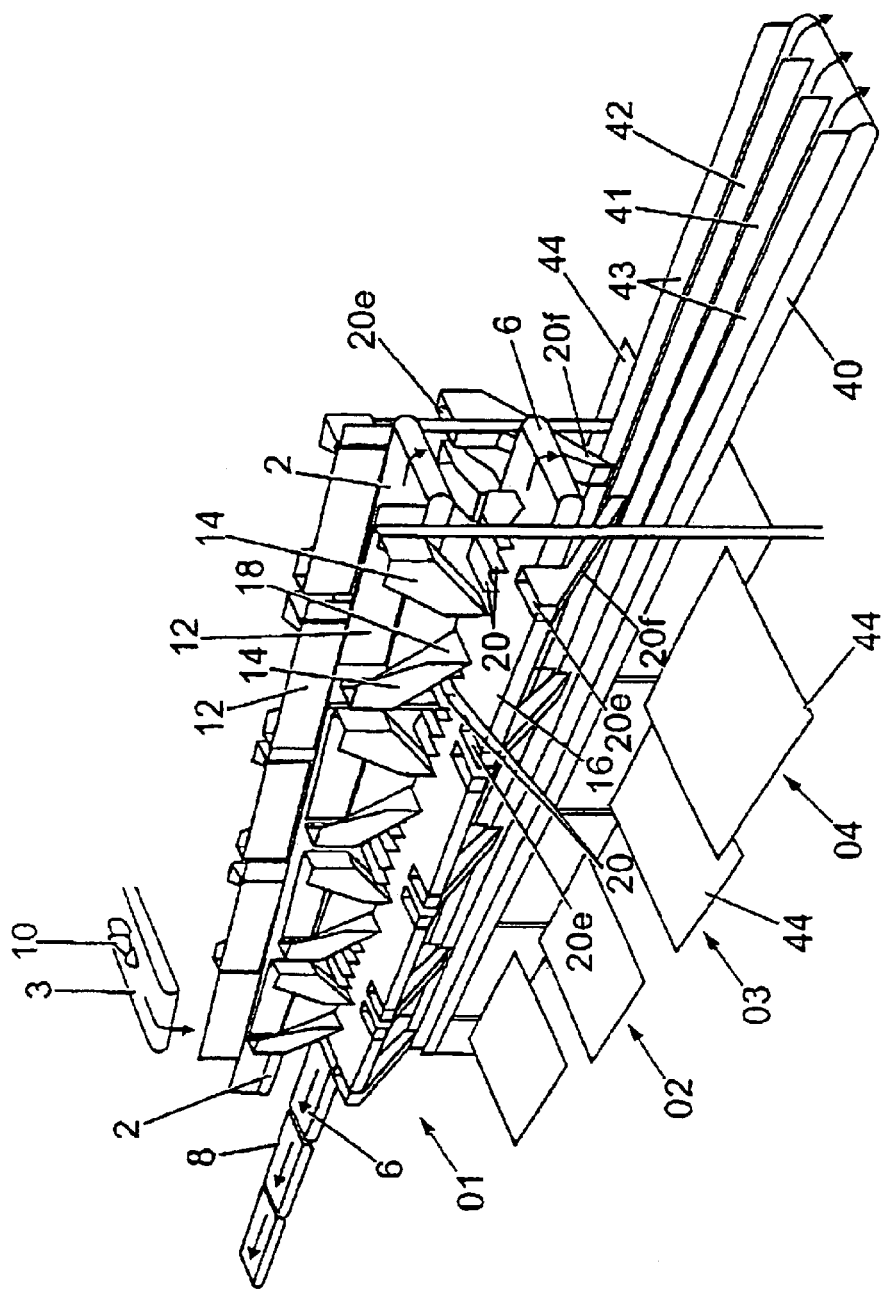
FIG. 4 is a perspective view of a preferred embodiment of a second embodiment of a trim table according to the invention.

In FIG. 4, a preferred form of a second embodiment of the invention is shown. The products 10 are supplied to the trim table, which comprises a number of operator stands O1, O2, . . . O8. The products 10 are delivered via a inlet conveyor 3 onto a conveyor 2 from which the products or portions of products 10, via sweepers 12 at each operator stand O1–O8, may be guided down to the operator on demand. The trays 14 in connection with the sweepers 12 are form a funnel shape, so that the products are guided away from the supply conveyor 2 via the sweepers 12 and down into the trays. The products then slide via the sloping sliding surfaces 18 down into the bottom of the funnel shaped tray which is essentially level with the cutting plate 16, and from which the operator easily may take out a product for trimming. On each side of the tray 14, sorting openings 14 are arranged for the different types of products that are cut out of the product or a portion of products. The products that are put into these openings are guided onwards down on a conveyor 6 for further processing, such as packaging. The conveyor 6 is moreover connected to a weighing station 8 for determination of the weight of the individual portions. The types of products in the individual openings are laid on the conveyor 6 in a predetermined order and opening means in connection with each of the openings 20, which are controlled by a superior control system (not shown), ensure that the products from each of the operator stands O1 to O8 are positioned on the conveyor 6 in a well known order, so that the subsequent sorting, e.g. for packaging or by product types, product weight, etc. may be carried out automatically and controlled by the superior control system.

At each side of the cutting plate 16 further sorting openings 20e are arranged, e.g., for the cut-away material, such as waste. The material which is put into these sorting openings 20e are guided via a chute 20f down a conveyor 40 for discharge. The conveyor 40 is preferably divided into sections by separation walls 41, 42 being arranged in the longitudinal direction of the conveyor. Moreover, sidewalls 43 are preferably arranged on each side of the conveyor 40. The chutes 20f are arranged in pairs at each operator stands and they are preferably designed in such a way that the material from each cutting plate 16 are guided down into different sections on the conveyor 40.

In FIG. 5, a schematic cross-sectional view is shown, which shows how the conveyors 2, 6, 40 are arranged in relation to each other and in relation to the operator stands of the trim table.

Each of the operator stands O1 to O8 are preferably provided with a platform, which may be adjusted in height relative to the cutting plate 16. Moreover, a preferably height adjustable chair 46 may be arranged on the platform 44 (see FIGS. 4 and 5).

In FIGS. 6a and 6b a third embodiment is shown, where the automatic transferal takes place by the tray 14, which acts as a receiving plate that may be tilted since the tray 14 at one end is hinged with a hinge 47 and which is supported by a telescopic actuator 48, such as an electric actuator or a pneumaticaly actuatable cylinder. As it may be seen in FIGS. 6a and 6b, the tray 14 is arranged substantially level with the supply conveyor 2 adjacent a sweeper 12, i.e., at a level above the cutting plate 16. The tray 14 is preferably arranged next to or displaced from the cutting plate 16 so that a product 10, which is swept away from the conveyor 2 over to the tray 14 by an operator activated inclination of the tray 14, slides down on the cutting table 16 for processing, such as shown in FIG. 6b. This embodiment makes the trim table particularly suitable for trimming of larger meat products, e.g., in connection with portion cutting of pork or beef.

Figure 7:
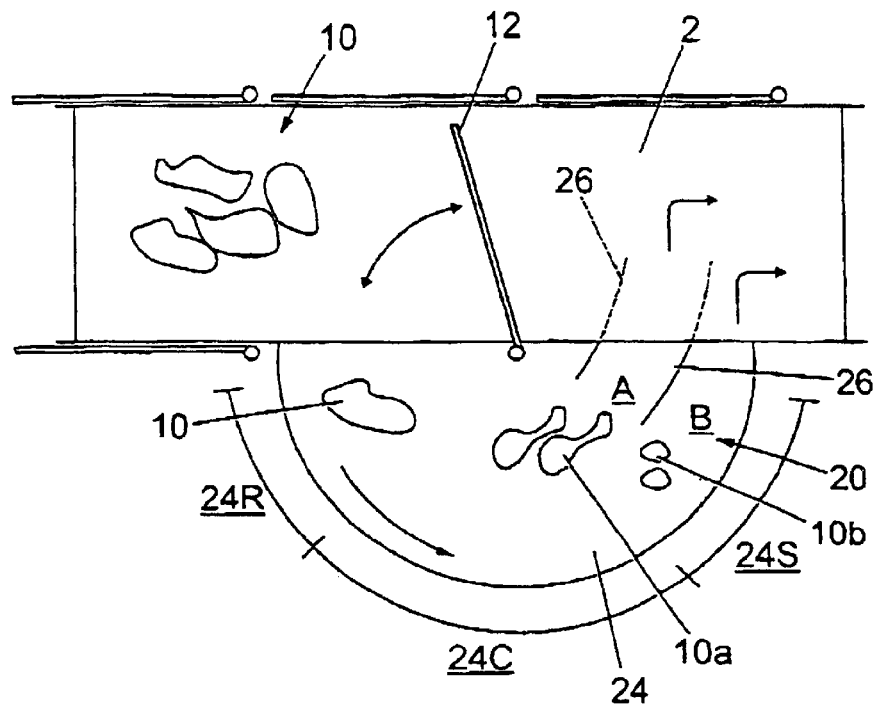
FIG. 7 is a top view of a fourth embodiment of a trim table according to the invention.

In FIG. 7 is shown a fourth embodiment of a trim table according to the invention. According to this embodiment, the products 10 are delivered on a rotatable cutting plate 24 which has a receiving section 24R at the edge of the conveyor 2 adjacent a sweeper arm 12, a cutting section 24C and a sorting section 24S. The cutting plate 24 is rotatably supported and may be rotated so that the products 10 which are delivered at the receiving section 24R are transferred to the cutting position 24C for trimming. When the products 10a, 10b are trimmed and cut out, they are sorted by placing the products in different radial positions on the plate 24 according to a classification, so that the product pieces in the emptying/sorting position 24S are swept off the plate 24 by one or more sorting ribs 26 that catches the sorted product pieces 10a, 10b and guide them away from the plate and onwards for farther processing.

Figure 8:
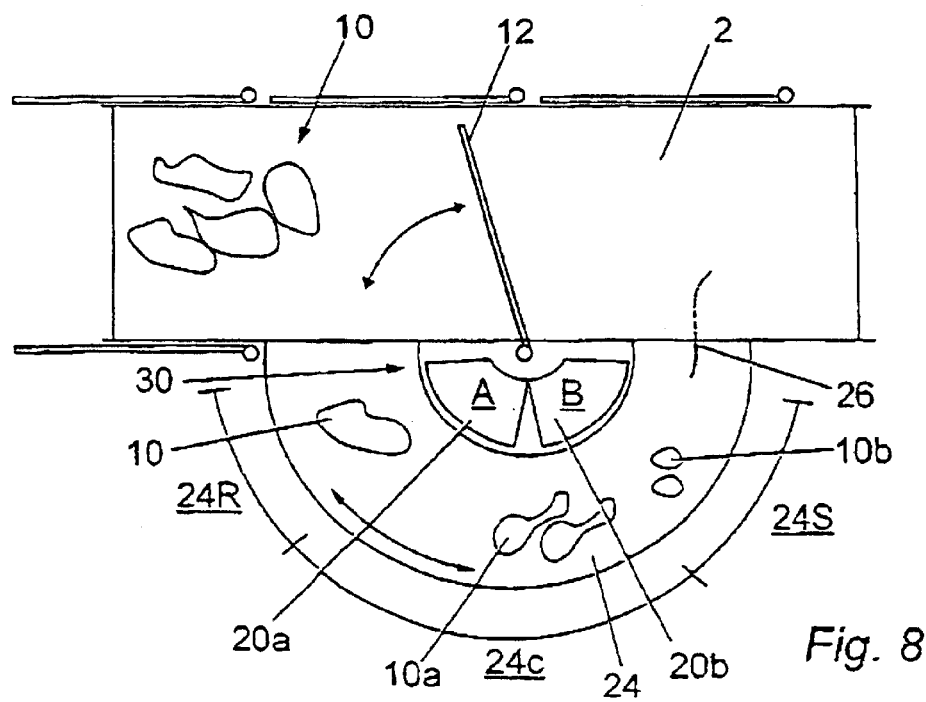
FIG. 8 is a top view of a variation of the fourth embodiment.

In a variation of this embodiment, the sorting means comprise a number of sorting openings 20a, 20b which are positioned in a concentric hole 30 in the cutting plate 24, as shown in FIG. 8. In these holes, the cut out product pieces are placed by the operator according to a classification of the product pieces 10a, 10b. Moreover, one or more sorting ribs 26 may also be arranged according to this embodiment, such as shown in FIG. 5. Beside the cutting plate, there may be arranged means for waste collection also, so that the cut away remains from the products simply may be swept over the side edge of the plate and down into the waste collection (not shown).

The cutting plate 24 is preferably shaped as a circular plate, which is provided with rotary drive means so that the operator simply has to give a signal in order to turn the products 10 on the plate 24 for transferring the products 10 to the next operation at the trim table. Alternatively or as a supplement, means may preferably be arranged for an automatic stop by a pressure on the cutting plate 24, so that the cutting plate 24 does not move when work is being done on the plate.

By the invention, it is realized that the arrangement of the operator stand according to the fourth embodiment of the invention may be mirrored in its design with respect to the design shown in FIGS. 7 and 8 in order to suit the operator stand to a left-handed operator.

In connection with the rotary cutting table 24, stationary knives or saws may potentially be arranged, e.g., in connection with the sorting ribs 26, so that the operator simply must orientate the products 10 on the cutting plate 24, so that the products automatically are cut out when they are rotated against such cutting ribs (not shown).

Figure 9:
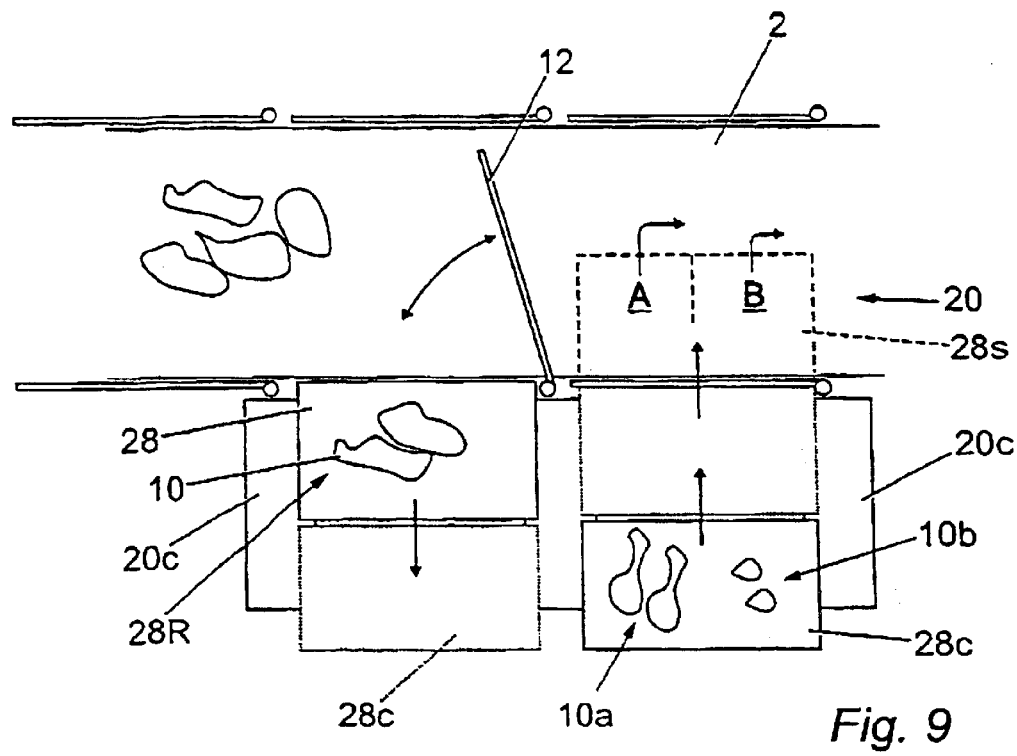
FIG. 9 is a top view of a fifth embodiment of a trim table according to the invention.
Figure 10:
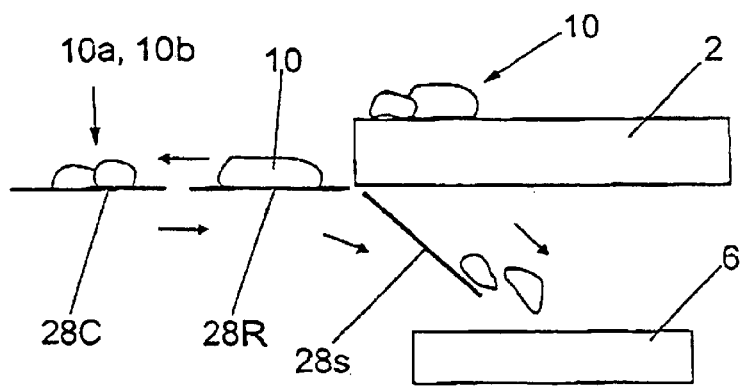
FIG. 10 is a schematic side view for illustration of a preferred variation of the fifth embodiment of the trim table.

A fifth embodiment of the invention is shown in FIGS. 9 and 10. Here, the products are received on a displaceable cutting plate 28. This embodiment is particularly suited for trimming smaller product portions and there are preferably arranged two adjacent cutting plates 28 at each operator stand.

Each cutting plate 28 is shiftably arranged for being displaceable between a receiving position 28R immediately adjacent the arm 12 by the conveyor 2. When the operator is ready to process a waiting portion for trimming, the cutting plate 28 may possibly be moved forward to a forward cutting position 28C or the products may be processed with the cutting plate in the position 28R. When the products 10 are processed, i.e., trimmed and cut out into product pieces 10a, 10b, these pieces are sorted on the plate, whereafter the cutting plate 28 is moved back to an emptying position 28S, where the plate 28 is pivoted or swept, so that the product pieces slide off the cutting plate 28 and down on a conveyor 6 for transport to further processing, potentially via an intermediate storage, so that the product pieces 10a, 10b are put on the outlet conveyor 6 in a predetermined manner. Between each of the cutting plates, collection magazines 20c are preferably arranged for product remains, such as cut-away remains.

Figure 11:
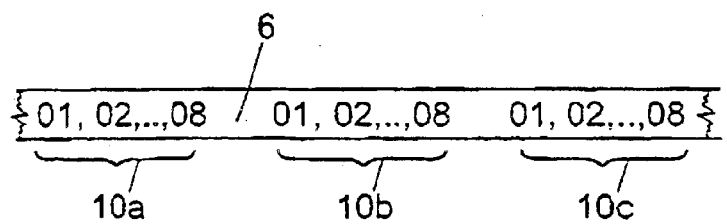
FIG. 11 shows the organization of the product piece on the outlet conveyor by a trim table according to the invention.

On the outlet conveyor 6, the production of product types from each of the operators is gathered, such as shown in FIG. 11. As indicated, sub-portions of product pieces 10a from O1, O2 to O8 respectively, and then, sub-portions of the next type of product pieces 10b are arranged successively on the conveyor 6. Each subportion from the individual operator is weight on the scale 8 (see FIG. 1) for surveillance of the productivity of the trim table. Moreover, a quality control unit may be built into the control system so that selected sub-portions are guided via a quality control unit for inspection of e.g., the quality of the trimming and the portion cutting of the product.

By the invention, it is realized that a trim table with means for automatic transfer of product portions to the cutting table may be arranged in other variant than the above described preferred embodiments without departing from the scope of the invention, which is described in the accompanying claims.

What is claimed is:

1. A trim table for use by trimming and/or cutting of food products, comprising conveying means for feeding products to a number of operator stands, each of which comprising receiving means for receiving products, a cutting table for at least one of trimming and cutting the products into product pieces, sorting means for sorting the cut or trimmed products and transport means for transporting the cut or trimmed products, wherein one or more of the operator stands are provided with means for automatic transferral of the products from the receiving means to the cutting table.

2. A trim table according to claim 1, wherein the receiving means are constituted by a tray for reception and storage of a portion of products and the means for transferral of the products comprise a sliding surface which connects the tray with the cutting table.

3. A trim table according to claim 2, wherein the tray is arranged at a level above the cutting table and wherein the sliding surface is provided with an inclination towards the cutting table.

4. A trim table according to claim 3, wherein at least one of the tray and the sliding surface is/are provided with at least one of a vibration means and a push device.

5. A trim table according to claim 2, wherein the sorting means include a number of sorting openings between the tray and the cutting table for categorisation of the trimmed product pieces and for dispatching of product remains, said openings being connected with means for further transport of the product pieces for at least one of further handling and dispatch of the product remains.

6. A trim table according to claim 2, wherein the tray is funnel-shaped and provided with two inclined sliding surfaces which guide the products down to the bottom of the funnel-shaped tray, said bottom being substantially in level with the cutting table.

7. A trim table according to claim 5, wherein means for collecting and delivery of the products from the sorting openings to a conveyor are arranged in association with the sorting openings, and wherein said means for delivery are controlled according to the achievement of a predetermined sorting pattern on the conveyor.

8. A trim table according to claim 5, wherein sorting openings are arranged at at least one side of the cutting table for receiving litter and are provided with chutes for the removal of the product remains.

9. A trim table according to claim 8, wherein an underlying conveyor is provided with a sectioning in longitudinal sections and where the chutes are arranged in association with an operator stand for delivery of product remains in different sections.

10. A trim table according to claim 1, wherein the receiving means are constituted by a tray for the receipt and storage of a product portion and the means for transfer of products comprise means for lowering the tray to the level of the cutting table.

11. A trim table according to claim 10, wherein the means for lowering the tray are constituted by a pivotable side-hinging of the tray and a telescopic actuator, whereby its surface constitutes a sliding surface.

12. A trim table according to claim 1, wherein the receiving means and the cutting table are a rotatable receiving and cutting plate which has a receiving position, a cutting position and a sorting position for the products, and wherein the means for transfer comprises rotation means for rotating the plate.

13. A trim table according to claim 12, wherein the cutting plate is a substantially circular cutting plate, which is rotatably arranged for rotation in the direction from the receiving position towards the sorting position.

14. A trim table according to claim 12, wherein the sorting means are provided with one or more stationary, essentially tangentially orientated sorting ribs for sorting and further transport of the cut/trimmed product pieces for further handling by rotation of the plate.

15. A trim table according to claim 14, wherein the sorting ribs are provided with stationary positioned cutting means for automatic cutting of the products by rotation of the cutting plate.

16. A trim table according to claim 12, wherein the cutting plate is rotatably arranged and provided with a concentric opening in which the sorting means, which comprise a number of sorting slots, are arranged.

17. A trim table according to claim 12, wherein the sorting means comprise a number of sorting openings between the conveying means and the cutting plate for sorting the cut/trimmed product pieces, said openings being connected to means for further transport of the product pieces for at least one of further handling and removal of the product remains.

18. A trim table according to claim 12, wherein, in association with the cutting plate, means are arranged for automatic rotation stop when a pressure is applied to the cutting plate.

19. A trim table according to claim 1, wherein the receiving means and the cutting table are a shiftable receiving and cutting plate which is provided with one or more categorisation markings for sorting the cut/trimmed products and which cooperates with means for further transport of the product pieces for further handling, said cutting plate being shiftable between a receiving and storage position and a retracted sorting and emptying position where the plate is at least partly guided in below the conveyor means.

20. A trim table according to claim 19, wherein the cutting plate is guidable to a forward cutting position relative to the receiving position for processing the products.

21. A trim table according to claim 19, wherein the shiftable cutting plate is substantially horizontally orientated in the receiving, storage and cutting positions and is pivoted for dispatching the cut products from the plate in the sorting and emptying position.

22. A trim table according to claim 19, wherein two adjacent, shiftable cutting plates are arranged at each operator stand.

23. A trim table according to claim 19, wherein the displacement of the cutting plate or plates is controlled by operator operated control means in a predetermined pattern of movement.

24. A trim table according to claim 1, wherein the conveying means comprise a first conveyor with a number of operator stands on each side of the conveyor and a second conveyor for further transport of the product pieces.

25. A trim table according to claim 24, wherein means for automatic weighing are arranged in connection with at least one of the inlet to the first conveyor of the trim table for weighing out the product portions and the second conveyor for weighing out the cut product pieces.

26. A trim table according to claim 1 wherein vacuum means are arranged in the cutting table for retaining the products during the trimming or cutting.

27. A trim table according to claim 1 wherein means for detecting product characteristics of the products to be trimmed, are arranged in connection with the cutting table.

28. A trim table according to claim 27, wherein the detection means include means for detecting bones in meat products and that means are arranged for returning sorted products which still contains bones to the operator.

29. A trim table according to claim 1, wherein the cutting table comprises a cutting plate mounted to be turned over or exchanged and means for detecting that the cutting plate has been turned over or exchanged.

30. A trim table according to claim 11, wherein the telescopic actuator is a pneumatically actuatable cylinder for pivoting the tray.

31. A trim table according to claim 28, wherein the means arranged for returning sorted products which still contain bones to the operator comprise means for leaving a detected product on the cutting plate and rotating the product to the cutting position.

* * * * *